Aug. 1, 1933. J. C. GIBSON Re. 18,910

PROCESS FOR COLORING TOY BALLOONS

Original Filed March 3, 1928

Inventor

John C. Gibson

By Faust F. Crampton

Attorney

Reissued Aug. 1, 1933 Re. 18,910

UNITED STATES PATENT OFFICE 18,910

PROCESS FOR COLORING TOY BALLOONS

John C. Gibson, Willard, Ohio, assignor to the Pioneer Rubber Company, Willard, Ohio, a Corporation of Ohio Original No. 1,720,594, dated July 9, 1929, Serial No. 258,867, March 3, 1928. Application for reissue June 26, 1931. Serial No. 546,988

4 Claims. (Cl. 8—5.)

My invention has for its object to provide a process of decoratively coloring rubber toy balloons or rubber bladders, whereby exceedingly attractive toy balloons or rubber bladders may be fantastically decorated in a plurality of variegated colors and shades thereof and over variform areas at a very low cost.

As is well known in connection with toy balloons, their salability is dependent quite entirely upon their attractive appearance and, moreover, the margin of profit in such artitcles is exceedingly small so that any process pertaining to the manufacture of such balloons, to be usable in the manufacture of the balloons, must necessarily be exceedingly small and at a very low cost. By my invention I have provided a process whereby balloon coloring materials may be utilized for producing variform contours and in the various shades of the colors.

To indicate in a general way the product of the process, I have illustrated in the accompanying drawing a toy balloon that has been treated in accordance with the process.

Figure 1:
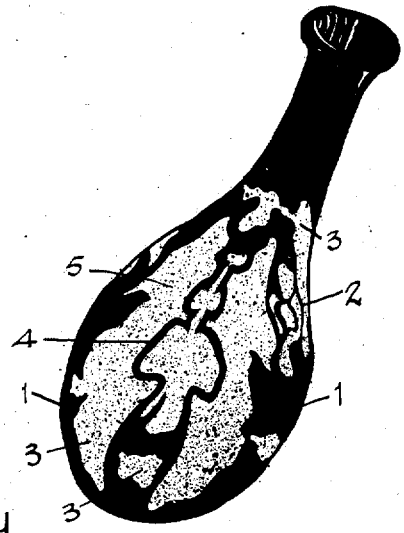
Figure 3:
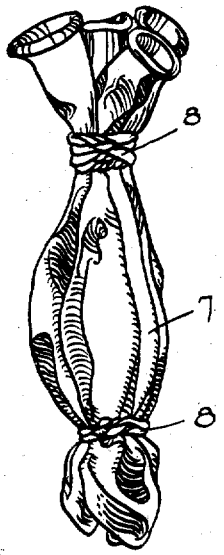
Figure 2:
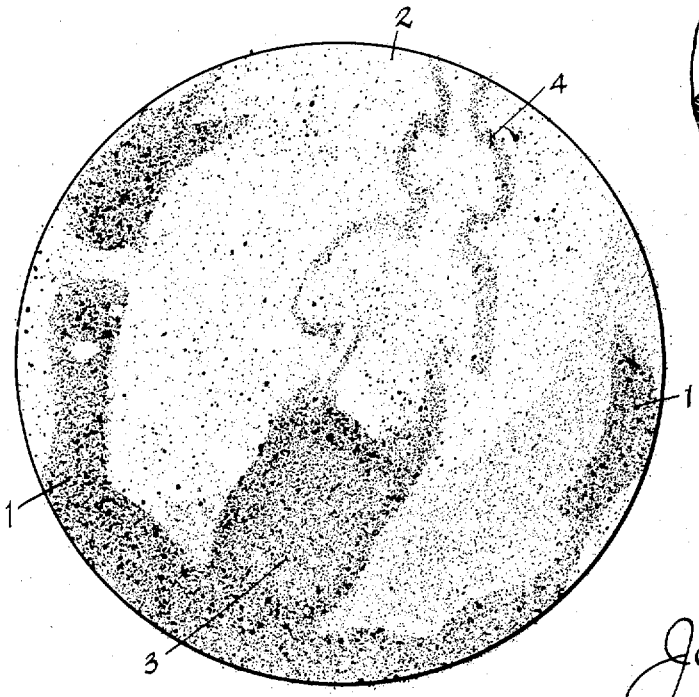

Fig. 1 illustrates a toy balloon after it has been colored by the process involving my invention. Fig. 2 indicates the coloring produced when the balloon, illustrated in Fig. 1, is distended. Fig. 3 illustrates a bundle of one or more balloons preparatory to their introduction into the balloon coloring material.

In carrying out my process, the balloons are colored over irregular areas and with variable intensity of colors by first bundling one or more, as from one to six, balloons in a bundle by tying or binding them together, without care as to their relative location or wrinkling or folding of parts and dipping them into balloon coloring materials contained in warm water and at a temperature from 125 to 180 degrees Fahrenheit. They are allowed to stand a short time, such as from one to five minutes, in the balloon coloring material that may be of any desired intensity. The small bundles of one to six balloons are then introduced into a rinsing liquid or solution. Water, at a more moderate temperature, may be used for rinsing the bundles, the bundles being stirred when in the rinsing liquid or solution to remove the surplus balloon coloring material that does not adhere to or penetrate the surface of the rubber. The bundles are then disassembled and the balloons permitted to dry. The balloons may then be packed for shipment.

Inasmuch as separated balloons cannot be made so that the parts of the balloons thus bundled will be located in exactly the same relation to each other, the process cannot possibly produce any two balloons exactly alike in coloring, which is an additional advantage for it gives a variety which increases the attractiveness where a plurality of the balloons are displayed for purposes of sale.

Also, if it is desired to produce a plurality of colors, and their shades, on the surfaces of the balloon, the balloons may be dipped in the first color as described above and then rinsed and, after thoroughly rinsing, the bundles may be introduced into a second balloon coloring material and subsequently rinsed. This may be repeated as many times as desired to produce various intensities of the colors and produce the varieties and combinations of colors that arise from mixing of colors, such as greens produced by yellows and blues and purples produced by reds and blues. Also, an exceedingly attractive line is produced by rebundling the balloons in small bundles of 1 to 6 balloons in each bundle after they have been colored by one color, as described above, and then insert them in a second color which will produce other variform patterns having variegated color and shades.

Preferably, the balloons are formed to have a basic color, the coloring being contained in the composition of the balloon itself which color is, preferably, contrastive to the colors that are added, in the manner described above. Thus, the balloons may be colored in light basic color, that is, light colored rubber may be used in the formation of the balloon. The greater the contrastive character of the rubber the more effective will be the colors added by my process.

Thus, as shown in Fig. 1, which is drawn from a balloon colored by my process, the directly exposed portions 1 of the balloon 2 is colored to the maximum intensity produced by the coloring material into which it is inserted, depending on the time in which the balloon is allowed to remain within the coloring material. The shaded portions 3 are produced by the various degrees of penetration of the coloring material within the folds and the wrinkles that are produced in the irregular bundling of the balloons, which also defines the areas 1 where the color reaches its maximum intensity. There is also frequently produced, by my process, a uniformity of outline as is illustrated in the central Figure 4, and the contour of the lighter shaded portions 3 and 5 which produce an attractive characteristic in the coloring of the balloons. When the balloons are distended, as shown in Fig. 2, the colorings become lighter but the balloons maintain their strikingly characteristic and attractive appearances. The parts, such as the part 4, become enlarged and distorted which aids the salability of the balloons.

The balloons may be bundled as may be desired. They may be bundled singly or in any number, or they may be confined for dipping by any suitable confining means and the balloons may be secured in their irregular and haphazard arrangement in any manner, such as by an elastic band or by clothes pins or by tying a bundle of balloons into a knot, or by confining them by any mechanical means. A plurality of balloons 7 are shown in Figure 3 as being secured by elastic bands 8 which may be located at the top and bottom. The balloons may be haphazardly folded and secured in bundled form by a single band or by tying two or more together, by clamping with clothes pins and springs, by pulling bundles part way through rings of wire or washers, or by placing them in a wire screen or placing layers of balloons under or between sheets of wire mesh, or plates having corrugated surfaces, or surrounding them by a plurality of pipes and binding the sheets or wire screen or corrugated sheets or plates or pipes having a plurality of balloons enclosed therein and thereby haphazardly enclosing or packing them in an enclosed and confined space by means of rubber bands or by tying the assembled layers of balloons and wire mesh or corrugated plates or pipes with cords. Any other mechanical means may be used for holding and confining the balloons singly or in any number in a haphazard arrangement in such a manner that the color cannot come in contact with the surface at certain points and will come in contact at other points and in variable degrees to produce a variable penetration of the coloring material throughout practically all the surfaces of the balloons to produce the results described above. When the balloons are thus enclosed they are dipped in one or more color solutions as described. Where a plurality of balloons or layers of balloons are placed under sheets or corrugated plates or wire screen or similar confining mechanical means, they are located in a suitable container, and preferably in irregular arrangement which produces a varying pressure over parts of the surfaces of each balloon, to enable submergence or covering of the balloons by one or more different coloring solutions to enable the variable penetrations of the color or colors as described above. When a plurality of the articles are surrounded by a plurality of pipes which, by reason of the cylindrical surfaces of the pipes, produces the desired variation in pressure on parts of the surfaces of the balloons, cords may be tied about the pipes to irregularly press the haphazardly placed balloons within the confines of the space produced by the pipes and then the bundle may be dipped in a pool bath of the coloring solution. When the balloons are placed in layers between sheets of wire mesh or sheets of corrugated metal or plates, the plates are maintained in their relative positions by any suitable means and the balloons thus confined within the plates are dipped in the solution to produce the variable penetration of the coloring material on the enclosed balloons.

I claim:

1. The process of coloring rubber bladders or toy balloons, which consists in bundling the balloons in irregular form, in a plurality of bundles, each bundle having but a few balloons, and introducing the bundles into a rubber coloring material and withdrawing the bundles from the rubber coloring material and introducing them into a rinsing liquid and separating the balloons in each bundle from each other and drying the balloons.

2. The process of coloring rubber bladders or toy balloons which consists in bundling in irregular form the balloons in lots of one to six in each bundle and introducing the bundles into a rubber coloring material and withdrawing the bundles from the rubber coloring material and introducing them into a rinsing liquid, and again rebundling them and again introducing the bundles into a coloring material having a coloring different from that of the first named coloring material, and again rinsing the bundles in a neutral liquid and separating the balloons of each bundle and drying the balloons.

3. The method of ornamenting thin rubber articles which comprises placing together a plurality of the articles in irregular arrangement and producing variable pressures of contacting surfaces of the articles and subjecting the articles to a rubber coloring solution thereby producing variation in penetration of the color solution and depositing the color irregularly upon the articles and variation in intensity of the color on the surfaces of the articles.

4. The process of coloring articles formed of thin sheet rubber which comprises haphazardly bundling the articles to cause the bundles to make irregular contact with each other and introducing the bundles into a rubber coloring material and withdrawing the bundles from the rubber coloring material and drying the articles.

JOHN C. GIBSON.